June 14, 1927.
A. T. SACRE
1,632,382
AUTOMOBILE WHEEL
Filed June 10, 1925
2 Sheets-Sheet 1
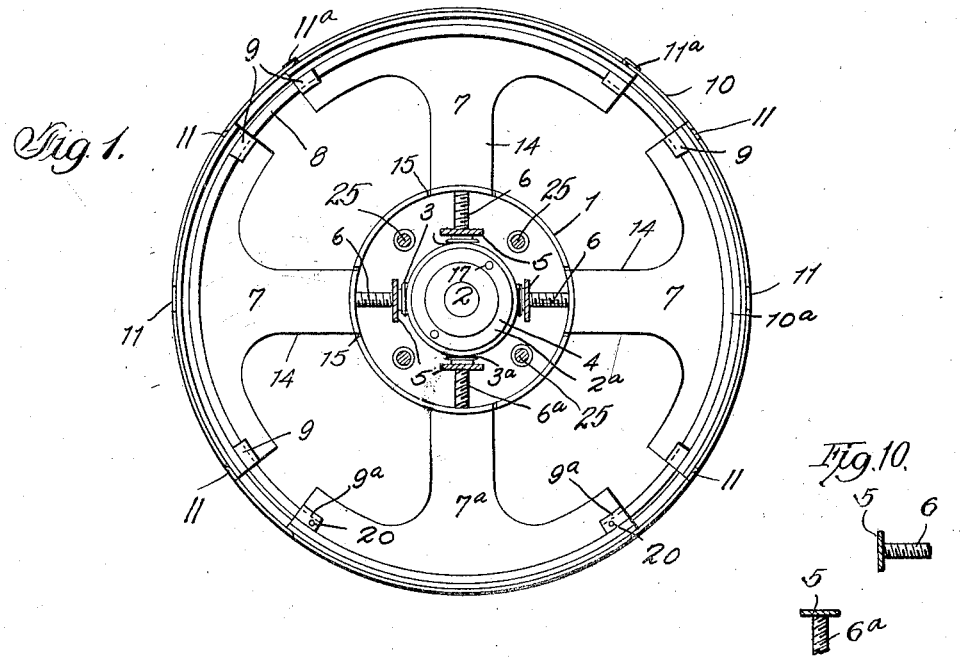
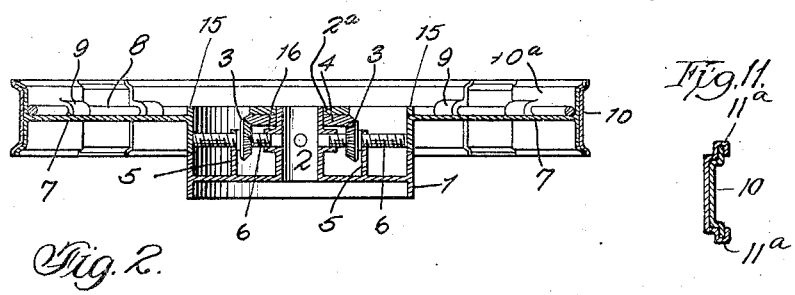
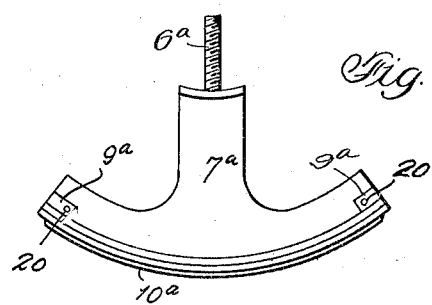
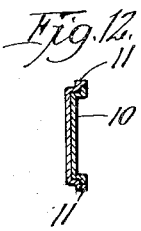
Inventor
Anton T. Sacre
By Edwin A. Clarkson
Attorney June 14, 1927.
A. T. SACRE
1,632,382
AUTOMOBILE WHEEL
Filed June 10, 1925
2 Sheets-Sheet 2
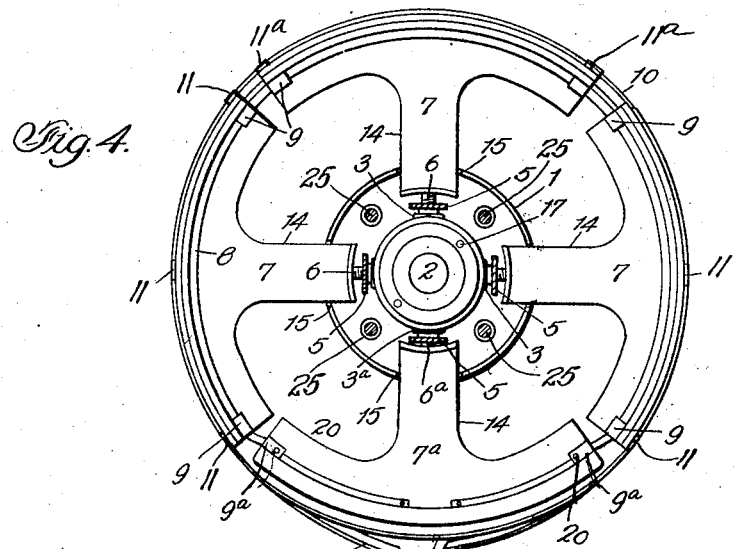
Fig. 4.
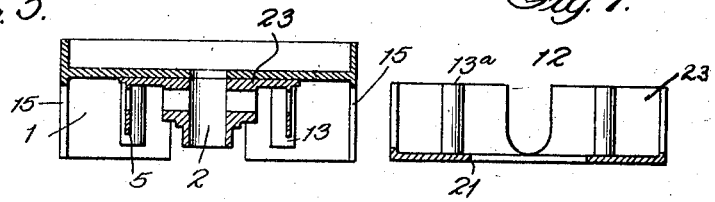
Fig. 5.
Fig. 7.
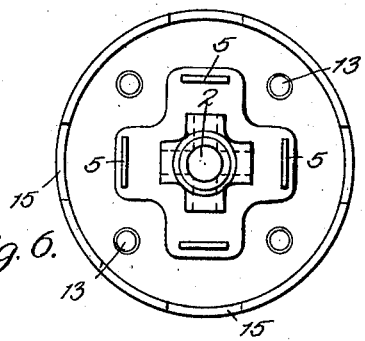
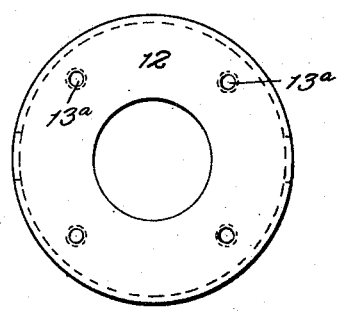
Fig. 6.
Fig. 8.
Fig. 9.
Inventor
Anton T. Sacre
By Edwin A. Clarkson
Attorney Patented June 14, 1927.

1,632,382

UNITED STATES PATENT OFFICE.

ANTON TOMIS SACRE, OF SAN ANTONIO, TEXAS.

AUTOMOBILE WHEEL.

Application filed June 10, 1925. Serial No. 36,190.

The invention relates to automobile wheels, and more particularly to a sectional wheel having a contracting rim.

The object of the invention is to provide a vehicle wheel of the above type, which may be readily contracted to facilitate removal of a tire, and which, when the tire has been replaced, may be readily expanded to hold the tire firmly in position upon the rim and locked in the expanded position.

The invention will be more readily understood by reference to the accompanying drawings in which—

Fig. 1 is an elevation showing the sectional wheel in expanded position;

Fig. 2 is a transverse central section of the wheel;

Fig. 3 is a detail view showing one of the wheel sections;

Fig. 4 is a view similar to Fig. 1, but showing the wheel contracted; and

Figs. 5 to 9 are detail views showing various parts of the structure.

Figure 10 is a fragmentary view showing the stems of the wheel sections with pitch exaggerated to indicate the difference in pitch on the different sections.

Figures 11 and 12 are detail sectional views showing respectively one of the rim clamps and rim clips.

Referring now principally to Figs. 1, 2 and 3, it will be noted that the wheel comprises a hub bearing 2, a hub housing 1, a plurality of movable wheel sections 7 and 7$^a$, a contracting rim section 10 mounted upon the wheel sections 7, and a rim section 10$^a$ which is secured to or formed integral with the wheel section 7$^a$.

The contracting rim section 10 is removable from the wheel sections 7, but is normally held in position by means of rim guides or clips 11 and rim clamps 11$^a$. A reinforcing ring 8 of spring steel is placed within the rim 10, as clearly shown in Fig. 2, its ends extending inwardly of the rim section 10$^a$. This ring is located by means of guides 9 and 9$^a$. The guides 9$^a$, carried by the wheel section 7$^a$, are provided with set screws 20, by means of which the reinforcing ring is normally secured against rotation. The purpose of the reinforcing ring 8 is to lend rigidity to the structure.

As illustrated, the wheel sections 7, shown as three in number, are carried by threaded draw shafts 6, while the section 7$^a$ is carried by a threaded shaft 6$^a$, the pitch of the threads of shaft 6$^a$ being greater than on the shafts 6. The movable sections 7, 7$^a$, are provided with reduced stems which pass through cut-away portions or guides 15 formed in the hub housing 1. The draw shafts 6, 6$^a$, are adapted to reciprocate through suitable guide openings in members 5 and 16, formed integral with the hub housing and hub bearing respectively.

As shown, the means for reciprocating the draw shafts 6, 6$^a$ consists of a plurality of internally threaded beveled pinions 3, 3$^a$, threadedly engaging the shafts 6, 6$^a$, and prevented from axial movement by engagement with the members 5 at one end and the members 16 at the other. The pinions 3, 3$^a$, mesh with a suitable beveled gear 4 rotatably mounted upon the hub bearing 2, and held in place by a ring 2$^a$, pressed onto the hub bearing after the gear 4 is placed. The gear 4 may be operated by any suitable means, as by a pin wrench, not shown, engaging the holes 17 upon the face of the gear 4.

By turning the gear 4 in one direction, it is obvious that the shafts 6, 6$^a$ will be drawn toward the center, carrying with them the wheel sections 7, 7$^a$, the section 7$^a$ being moved more rapidly than sections 7, owing to the greater pitch of the draw shaft 6$^a$. The set screws 20 on the reinforcing ring 8 having been released, the ends of the ring 8 approach each other in the manner shown in Fig. 4. The rim section 10$^a$, being rigid with the wheel section 7$^a$, moves inwardly to the position shown in Fig. 4, while the section 10 contracts in the manner shown, being guided by the clips 11, but held to one of the sections 7 by means of the rim clamps 11$^a$. When the wheel is in the contracted condition shown in Fig. 4, the tire (not shown) carried upon the rim may be readily removed and replaced. To expand the wheel it is only necessary to turn the gear 4 in the proper direction, thus moving the wheel sections 7, 7$^a$ outwardly at a differential rate.

When the tire is in position and the wheel expanded the set screws 20 in the reinforcing ring 8 are replaced. A locking drum 12 is now telescoped within the axle housing 1, the flanged portion 23 of drum 12 being cut away at intervals, sufficiently to fit over the drawshafts 6, 6$^a$, but not allowing the stems 14 of wheel sections 7, 7ª, to pass through. In this manner the wheel is securely locked in expanded position. As shown, the axle housing 1 and drum 12 are provided with telescoping guide tubes 13 and 13ª respectively, through which are passed bolts 25 which serve to hold the drum in position.

Briefly stated the operation of the device is as follows: When the master gear is turned by means of a pin wrench, the pinions turn on the draw shafts, pulling the wheel sections toward the center of the wheel. Three of the draw shafts are threaded with fine threads, and one with coarse threads, this shaft moving slightly faster than the other three. The wheel-section that moves faster carries a section of the tire rim riveted to it. This section of rim, moving in toward the center, releases from its flush position in relation to the removable rim, allowing the ends of the removable rim to spring towards one another. This action, coupled with the movement of the wheel sections toward the center, shrinks the rim to such an extent that the tire is easily taken off and replaced. When the tire has been replaced, the master gear is turned in the opposite direction until the four wheel sections are in their correct positions to lock the wheel in the expanded position, the lock drum is slipped inside the hub housing, tubes fitting inside of tubes.

The invention has been described in considerable detail for the purpose of illustration, but it is obvious that many changes may be made without departing from the spirit of the invention.

Having thus described my invention, what I claim as new and desire to secure by Letters Patent is:—

A combined wheel and rim comprising an expansible wheel having a plurality of sections certain of said sections movable toward and from the center of the wheel at the same rate, a rim section carried by the wheel sections movable at the same rate, and another wheel section movable at a different rate from said first named wheel sections having a rim section secured thereto, and common means for operating all said wheel sections.

In testimony whereof I affix my signature.

ANTON TOMIS SACRE.